(12) United States Patent
Cho et al.

(10) Patent No.: US 12,528,008 B2
(45) Date of Patent: Jan. 20, 2026

(54) VIRTUAL GOLF SIMULATION DEVICE AND VIRTUAL GOLF SIMULATION METHOD

(71) Applicant: GOLFZON CO., LTD., Seoul (KR)

(72) Inventors: Seongin Cho, Seoul (KR); Changhyun Oh, Suwon-si (KR)

(73) Assignee: GOLFZON Co., Ltd., Seoul (KR)

( * ) Notice: Subject to any disclaimer, the term of this patent is extended or adjusted under 35 U.S.C. 154(b) by 350 days.

(21) Appl. No.: 18/147,357

(22) Filed: Dec. 28, 2022

(65) Prior Publication Data

US 2023/0135033 A1 May 4, 2023

Related U.S. Application Data

(63) Continuation of application No. PCT/KR2021/007523, filed on Jun. 16, 2021.

(30) Foreign Application Priority Data

Jun. 29, 2020 (KR) .......................... 10-2020-0078978

(51) Int. Cl.
*A63B 71/06* (2006.01)
*A63B 24/00* (2006.01)
*A63B 69/36* (2006.01)

(52) U.S. Cl.
CPC ...... *A63B 71/0622* (2013.01); *A63B 24/0006* (2013.01); *A63B 69/3623* (2013.01); *A63B 2024/0015* (2013.01); *A63B 2071/0638* (2013.01); *A63B 2214/00* (2020.08); *A63B 2220/05* (2013.01); *A63B 2220/807* (2013.01)

(58) Field of Classification Search
None
See application file for complete search history.

(56) References Cited

U.S. PATENT DOCUMENTS

| 8,409,024 | B2 | 4/2013 | Marty et al. |
| 8,926,443 | B2* | 1/2015 | Woo .................... A63B 24/0003 463/7 |
| 9,242,158 | B2* | 1/2016 | Woo ......................... A63F 13/65 |
| 9,314,683 | B2* | 4/2016 | Lee ..................... A63B 69/3658 |

(Continued)

FOREIGN PATENT DOCUMENTS

| JP | 2007-301173 A | 11/2007 |
| JP | 2010-082430 A | 4/2010 |

(Continued)

OTHER PUBLICATIONS

English translation of KR 10-1404067 A1 (Year: 2014).*

(Continued)

*Primary Examiner* — Seng H Lim
(74) *Attorney, Agent, or Firm* — Sughrue Mion, PLLC

(57) ABSTRACT

Proposed are a virtual golf simulation device and a virtual golf simulation method. According to an embodiment, there is provided a virtual golf simulation device including: a first trajectory processing unit configured to simulate a first movement trajectory of a ball on a virtual golf course based on shot data on a golf shot of a user; and a second trajectory processing unit configured to simulate a second movement trajectory based on some of a plurality of factors for the simulation of the first trajectory.

8 Claims, 7 Drawing Sheets

(56) References Cited

U.S. PATENT DOCUMENTS

| | | | | |
|---|---|---|---|---|
| 9,333,409 B2* | 5/2016 | Jang | ................... | A63B 67/02 |
| 9,514,379 B2* | 12/2016 | Park | ................... | G09B 19/0038 |
| 10,773,147 B2* | 9/2020 | Okazaki | ............ | A63B 71/0622 |
| 11,007,424 B2* | 5/2021 | Jung | ................... | A63F 13/27 |
| 11,040,264 B2* | 6/2021 | Jang | ................... | H04L 67/131 |
| 12,017,132 B2* | 6/2024 | Lee | ................... | G06T 19/00 |
| 2005/0272514 A1* | 12/2005 | Bissonnette | ...... | A63B 69/3658 |
| | | | | 473/151 |
| 2008/0182685 A1* | 7/2008 | Marty | ................... | A63B 69/38 |
| | | | | 473/407 |
| 2008/0312010 A1* | 12/2008 | Marty | ................... | G06T 7/20 |
| | | | | 73/865.4 |
| 2012/0289351 A1* | 11/2012 | Woo | ................... | A63B 24/0003 |
| | | | | 473/409 |
| 2012/0295677 A1* | 11/2012 | Ok | ................... | A63B 24/0021 |
| | | | | 463/2 |
| 2014/0003666 A1* | 1/2014 | Park | ................... | G09B 19/0038 |
| | | | | 382/103 |
| 2015/0011279 A1* | 1/2015 | Koo | ................... | A63F 13/573 |
| | | | | 463/3 |
| 2016/0158640 A1* | 6/2016 | Gupta | ................... | A63F 13/812 |
| | | | | 463/3 |

FOREIGN PATENT DOCUMENTS

| | | | | |
|---|---|---|---|---|
| JP | 5960333 B1 | 8/2016 | | |
| JP | 2017-000180 A | 1/2017 | | |
| KR | 10-2003-0058894 A | 7/2003 | | |
| KR | 10-2009-0021407 A | 3/2009 | | |
| KR | 10-1059325 B1 | 8/2011 | | |
| KR | 10-2014-0047202 A | 4/2014 | | |
| KR | 10-2018-0014141 A | 2/2018 | | |
| KR | 10-1878100 B1 | 7/2018 | | |
| KR | 101928222 B1 * | 12/2018 | ............. | A63B 69/36 |
| KR | 20190112348 A * | 10/2019 | ............. | G06F 21/40 |

OTHER PUBLICATIONS

English translation of KR 2019-0112348 A provided by IP.com (Year: 2019).*

English translation of KR 10-1928222 B1 provided by IP.com (Year: 2018).*

International Search Report for PCT/KR2021/007523 dated Oct. 12, 2021.

* cited by examiner

| No. | BALL SPEED (m/s) | ANGLE OF DEPARTURE (degrees) | BACKSPIN (rpm) | SIDESPIN (rpm) | CARRY (m) | DRIVING DISTANCE (m) |
|---|---|---|---|---|---|---|
| 1 | 62 | 8.9 | 2,400 | 99 | 204 | 219 |
| 2 | 61 | 7.8 | 3,000 | 100 | 196 | 216 |
| 3 | 63 | 12.1 | 3,000 | 101 | 211 | 231 |
| 4 | 62 | 8 | 2,800 | 100 | 197 | 218 |
| AVERAGE | 62 | 9.2 | 2,800 | 100 | 202 | 221 |

| BALL SPEED (m/s) | ANGLE OF DEPARTURE (degrees) | BACKSPIN (rpm) | SIDESPIN (rpm) | CARRY (m) | DRIVING DISTANCE (m) |
|---|---|---|---|---|---|
| 62 | 8 | 2,800 | 100 | 197 | 218 |
| 62 | 9 | 2,800 | 100 | 202 | 221 |
| 62 | 10 | 2,800 | 100 | 204 | 222 |
| 62 | 11 | 2,800 | 100 | 205 | 224 |
| 62 | 12 | 2,800 | 100 | 206 | 225 |
| 62 | 13 | 2,800 | 100 | 208 | 227 |
| 62 | 14 | 2,800 | 100 | 207 | 226 |
| 62 | 15 | 2,800 | 100 | 205 | 223 |

| BALL SPEED (m/s) | ANGLE OF DEPARTURE (degrees) | BACKSPIN (rpm) | SIDESPIN (rpm) | CARRY (m) | DRIVING DISTANCE (m) |
|---|---|---|---|---|---|
| 62 | 9 | 2,200 | 100 | 195 | 215 |
| 62 | 9 | 2,400 | 100 | 198 | 217 |
| 62 | 9 | 2,600 | 100 | 201 | 220 |
| 62 | 9 | 2,800 | 100 | 202 | 221 |
| 62 | 9 | 3,000 | 100 | 206 | 225 |
| 62 | 9 | 3,200 | 100 | 202 | 220 |
| 62 | 9 | 3,400 | 100 | 197 | 216 |
| 62 | 9 | 3,600 | 100 | 195 | 214 |

VIRTUAL GOLF SIMULATION DEVICE AND VIRTUAL GOLF SIMULATION METHOD

TECHNICAL FIELD

The embodiments disclosed herein relate to a virtual golf simulation device and a virtual golf simulation method, and more particularly to a device and method that simulate additional virtual ball movement in addition to simulating ball movement on a virtual golf course based on a golf shot of a user.

BACKGROUND ART

Recently, the popularity of screen golf ranges has been increasing. Screen golf ranges are cheaper to use than actual golf courses and can be enjoyed without restrictions on time, location, and/or the like, so that anyone can visit the screen golf ranges and easily enjoy golf simulation games.

In screen golf, the movement of a virtual ball on a virtual golf course is simulated and provided in response to the hitting of a golf ball by a user. In this case, the driving distance and trajectory of the ball are based on shot data on the golf shot of the user. In other words, a carry and the driving distance are provided by acquiring the trajectory of the flight of the ball in such a manner as to detect a motion related to the hitting of the golf ball by the user, calculate shot data such as a ball speed, an angle of departure, a backspin, and a sidespin, and apply the shot data to golf physics.

Such a screen golf range can calculate a driving distance by acquiring shot data only when a user makes a golf shot. Accordingly, there is a problem in that it is difficult to increase the maximum driving distance for a user who does not know his or her own problem, such as the problem of continuously making golf shots in wrong posture. In addition, there may be physical limitations that are difficult for a user to overcome. In this regard, there are some cases where efforts to improve the driving distance are unnecessarily made without being aware of these limitations.

In connection with this, Korean Patent Application Publication No. 10-2003-0058894, which is a related art document, discloses a technology designed to enable anyone to enjoy golf in a limited place regardless of place or age. The technology provides a simulator using a virtual golf system, an environment setting system, a score statistics system, a communication system, and a detection system to a user, so that an effect can be achieved in that the user virtually visits domestic and foreign famous golf courses and then enjoys golf without actually going to the golf courses.

The above published patent discloses only a technology of implementing a screen golf system and providing a virtual golf game to a user, but neither recognizes the above-described problems nor suggests a solution thereto.

Therefore, there is a demand for a technology for overcoming the above-described problems.

Meanwhile, the above-described background technology corresponds to technical information that has been possessed by the present inventor in order to contrive the present invention or that has been acquired in the process of contriving the present invention, and can not necessarily be regarded as well-known technology that had been known to the public prior to the filing of the present invention.

DISCLOSURE

Technical Problem

An object of the embodiments disclosed herein is to propose a virtual golf simulation device and a virtual golf simulation method.

Another object of the embodiments disclosed herein is to propose a virtual golf simulation device and virtual golf simulation method that are capable of providing an additional ball movement trajectory in addition to a ball movement trajectory based on a golf shot of a user.

Another object of the embodiments disclosed herein is to propose a virtual golf simulation device and virtual golf simulation method that induce a user to improve his or her shot by providing feedback on a golf shot of the user.

Technical Solution

In order to accomplish the above objects, the embodiments disclosed herein simulate a first movement trajectory of a ball on a virtual golf course based on shot data on a golf shot of a user and additionally simulate a second movement trajectory based on some of a plurality of factors for the simulation of the first movement trajectory.

Advantageous Effects

According to one of the above-described solutions, there may be proposed the virtual golf simulation device and the virtual golf simulation method.

Furthermore, the embodiments disclosed herein may propose the virtual golf simulation device and virtual golf simulation method that are capable of providing an additional ball movement trajectory in addition to a ball movement trajectory based on a golf shot of a user. Through this, a user is helped to improve his or her driving distance by suggesting a user's practice direction.

Moreover, the embodiments disclosed herein may propose the virtual golf simulation device and virtual golf simulation method that induce a user to improve his or her shot by providing feedback on a golf shot of the user. In particular, a driving distance may be improved by simply changing an angle of departure or the amount of spin in the physical condition of a user, so that an efficient practice plan may be suggested to the user.

The effects that can be obtained by the embodiments disclosed herein are not limited to the above-described effects, and other effects that have not been described above will be clearly understood by those having ordinary skill in the art, to which the present invention pertains, from the following description.

DESCRIPTION OF DRAWINGS

FIGS. 3 to 7 are exemplary diagrams illustrating the virtual golf simulation device according to the embodiment disclosed herein.

BEST MODE

Figure 1:
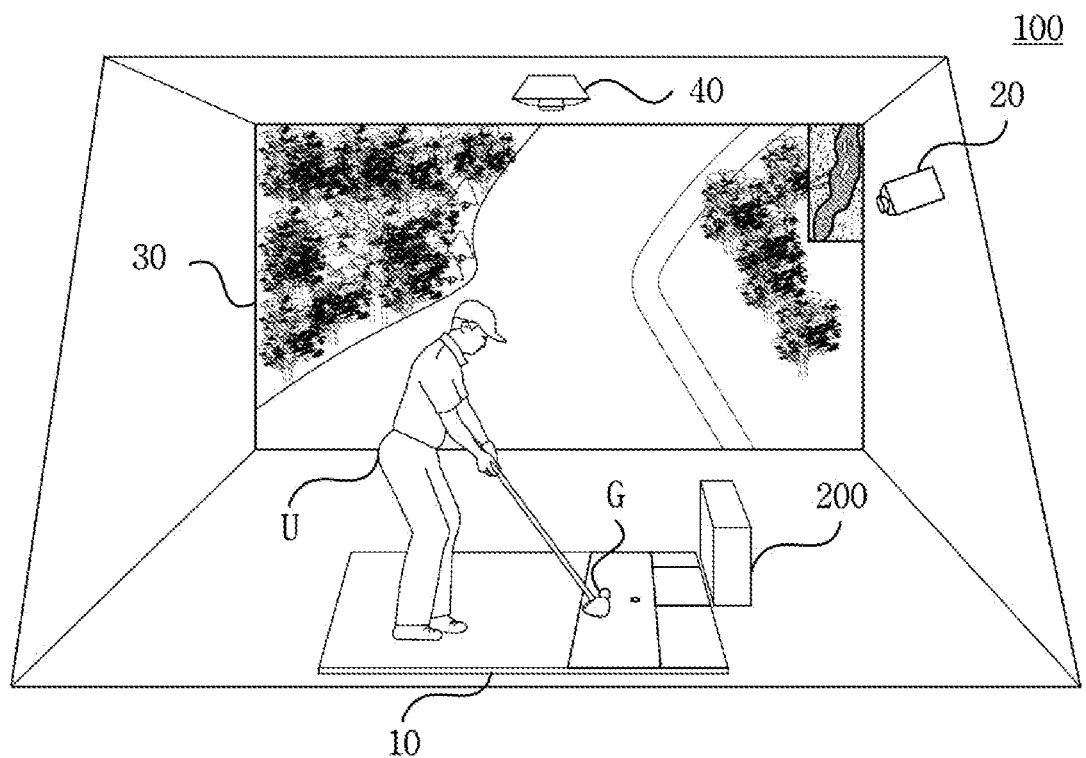
FIG. 1 is a diagram showing a screen golf system in which a virtual golf simulation device according to an embodiment disclosed herein is implemented.

As a technical solution for overcoming the above technical problems, according to an embodiment described therein, there is provided a virtual golf simulation device for simulating the movement of a ball on a virtual golf course, the virtual golf simulation device including: a first trajectory processing unit configured to simulate a first movement trajectory of a ball on a virtual golf course based on shot data on a golf shot of a user; and a second trajectory processing unit configured to simulate a second movement trajectory based on some of a plurality of factors for the simulation of the first trajectory.

Furthermore, as a technical solution for overcoming the above technical problems, according to an embodiment described therein, there is provided a virtual golf simulation method by which a virtual golf simulation device simulates the movement of a ball on a virtual golf course, the virtual golf simulation method including: acquiring shot data on a golf shot of a user; and simulating a first movement trajectory of a ball on a virtual golf course based on the shot data, and also simulating a second movement trajectory based on some of a plurality of factors for the simulation of the first trajectory.

MODE FOR INVENTION

Various embodiments will be described in detail below with reference to the accompanying drawings. The following embodiments may be modified to various different forms and then practiced. In order to more clearly illustrate features of the embodiments, detailed descriptions of items that are well known to those having ordinary skill in the art to which the following embodiments pertain will be omitted. Furthermore, in the drawings, portions unrelated to descriptions of the embodiments will be omitted. Throughout the specification, like reference symbols will be assigned to like portions.

Throughout the specification, when one component is described as being "connected" to another component, this includes not only a case where the one component is 'directly connected' to the other component but also a case where the one component is 'connected to the other component with a third component arranged therebetween.' Furthermore, when one portion is described as "including" one component, this does not mean that the portion does not exclude another component but means that the portion may further include another component, unless explicitly described to the contrary.

Embodiments of the present invention will be described in detail below with reference to the accompanying drawings.

Figure 2:
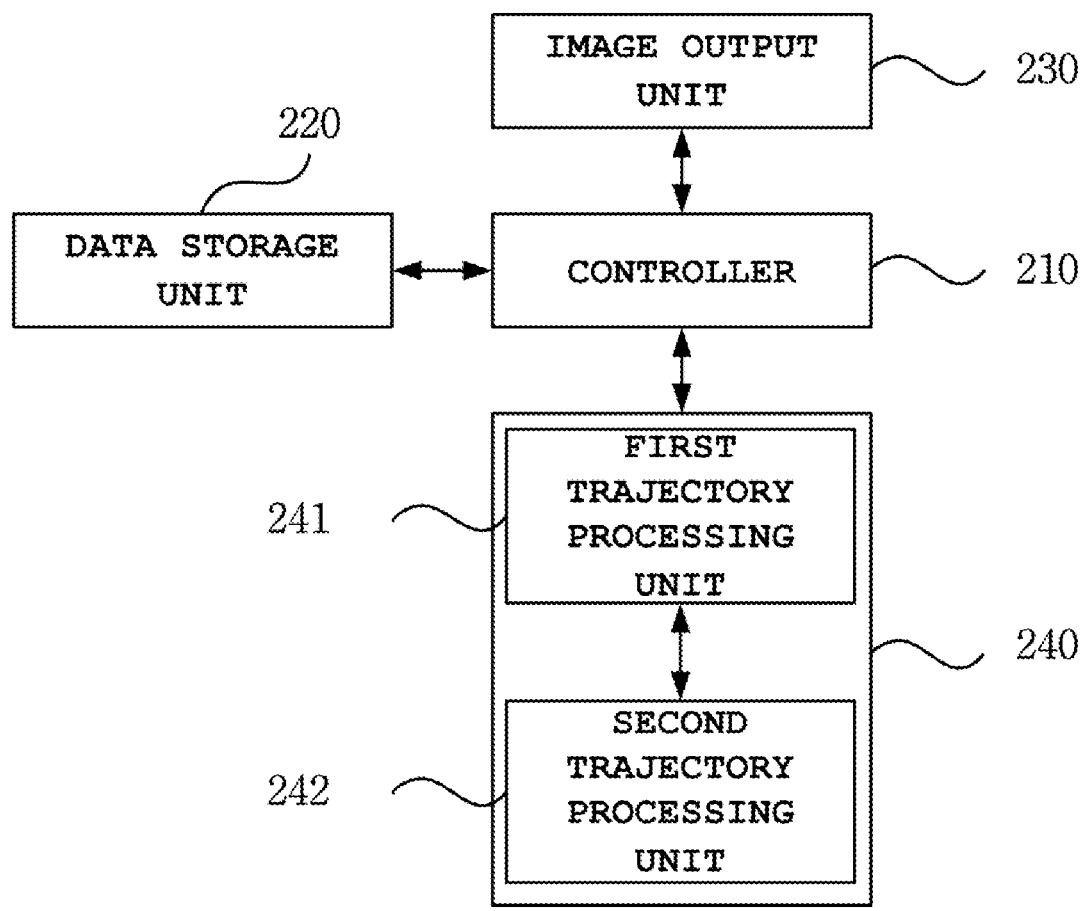
FIG. 2 is a block diagram showing the configuration of the virtual golf simulation device according to the embodiment disclosed herein.

FIG. 1 is a diagram showing a screen golf system in which a virtual golf simulation device according to an embodiment disclosed herein is implemented, FIG. 2 is a block diagram showing the configuration of the virtual golf simulation device, and FIGS. 3 to 7 are exemplary diagrams illustrating the virtual golf simulation device according to the embodiment disclosed herein.

As shown in FIG. 1, a screen golf system 100 according to an embodiment described therein includes: a swing plate 10 configured such that a user U can hit a golf ball G thereon; a sensing device 20 configured to detect the movement of at least one of the user U, the golf ball G, and a golf club; an image output device 40 configured to output a predetermined image to a screen 30 provided on the front side; and a virtual golf simulation device 200 configured such that all types of data required for virtual golf simulation are stored and processed therein.

The virtual golf simulation device 200 according to the embodiment described therein stores all types of data required for virtual golf simulation, and processes all images related to virtual golf simulation, such as an image of a virtual golf course and an image of the movement of a golf ball. In addition, images processed by the virtual golf simulation device 200 are displayed on the screen 30.

Accordingly, when the user U hits the golf ball G toward the screen 30 on the swing plate 10, the sensing device 20 may sense it and transfer it to the virtual golf simulation device 200, and the virtual golf simulation device 200 may simulate a virtual ball trajectory on a virtual golf course based on the movement of at least one of the user U, the golf ball G, and the golf club. In other words, the virtual golf simulation device 200 may construct golf simulation image information, such as an image of the movement of a ball on a virtual golf course, by taking into consideration the characteristics of the movement of an actual golf ball, and may project the golf simulation image information onto the screen 30 through the image output device 40 implemented as a projector or the like, thereby allowing a golf game to be played through simulation.

In addition, the virtual golf simulation device 200 operates to process all complicated manipulations for virtual golf simulation. For example, the virtual golf simulation device 200 may allow a user to log in for virtual golf simulation or to manipulate a simulation environment in response to the acquisition of a manipulation command. Accordingly, the virtual golf simulation device 200 may receive the setting of a training mode and the like from the user.

Meanwhile, the sensing device 20 according an embodiment is a device that acquires an image of a situation in which the golf ball G is hit by the golf club in a hitting area while monitoring the hitting area, i.e., a predetermined area where the golf ball G is placed and hit by the golf club in the swing plate 10, and senses the movement of at least one of the user U, the golf ball G, and the golf club from the image.

The sensing device 20 may be provided as an imaging device such as a vision sensor that takes an image of the hitting area. In connection with this, although the sensing device 20 is shown as being installed on a wall of the screen golf system in FIG. 1, the sensing device 20 may be implemented as a sensor installed on the ceiling of the screen golf system and a sensor installed on a side wall of the screen golf system. Alternatively, the sensing device 20 may be implemented on the virtual golf simulation device 200. For example, when the sensing device 20 is implemented as two vision sensors, the two vision sensors may monitor the hitting area in an overlapping manner. This is an example, but the sensing device 20 is not necessarily limited to this and includes cases in which two or more vision sensors are installed. The location where the vision sensor is installed may include all cases where the vision sensor is installed anywhere in the booth of the screen golf system as well as the ceiling or wall.

As the sensing device 20 detects the movement of at least one of the user, the golf ball and the golf club, the sensing device 20 calculates sensing information such as movement parameters for the movement of the golf ball, and transfers the sensing information to the virtual golf simulation device 200. The virtual golf simulation device 200 may calculate shot data from the sensing information.

Although the virtual golf simulation device 200 according to the embodiment described herein has been described as being applied to the screen golf system 100 in detail, the application thereof is not necessarily limited to the screen golf system 100, but it may be applied to all types of systems or devices in which a virtual golf course is simulated and imaged and an image of the movement of a virtual ball is simulated.

Meanwhile, as shown in FIG. 2, the virtual golf simulation device 200 may include a controller 210, a data storage unit 220, an image output unit 230, and an image processing unit 240.

The controller 210 may control the overall operation of the virtual golf simulation device 200, and may include a processor such as a CPU.

For example, the controller 210 may execute a program stored in the data storage unit 220, may read a file stored in the data storage unit 220, or may store a new file in the data storage unit 220.

In contrast, various types of data such as files, applications, and programs may be installed and stored in the data storage unit 220. For example, a program for performing a virtual golf simulation method may be installed in the data storage unit 220. Accordingly, the controller 210 may perform a virtual golf simulation method by executing the program stored in the data storage unit 220.

The data storage unit 220 stores all types of data required to implement images of virtual golf simulation. For example, the data storage unit 220 may store data related to a virtual golf course implemented by visualizing an actual golf course.

To this end, the data storage unit 220 may be configured to receive various types of data related to a virtual golf course from a server (not shown) over a network and to temporarily store them.

Furthermore, the data storage unit 220 may be configured to receive sensing information such as movement parameters related to the movement of a golf ball from the sensing device 20 and to temporarily store it.

Meanwhile, the image output unit 230 projects a simulation image, processed by the image processing unit 240, onto the screen 30 through the image output device 40 so that the user can view the image.

In this case, the image processing unit 240 may perform information processing to implement an image related to a virtual golf course using the data related to the virtual golf course stored in the data storage unit 220, and may simulate and implement the ball movement trajectory of the golf ball G, hit by the user, on the virtual golf course as an image.

The image processing unit 240 may include a first trajectory processing unit 241 and a second trajectory processing unit 242.

The first trajectory processing unit 241 may calculate the first movement trajectory of a ball on a virtual golf course. In this case, the 'first movement trajectory' represents a result obtained by simulating the movement of the ball on the virtual golf course as the user hits the golf ball. The first movement trajectory is represented by a form in which a ball moves on the virtual golf course, by a form obtained by connecting the traces of the movement of the ball on the virtual golf course with lines, or by text, image, voice, or video indicating a driving distance value.

The first trajectory processing unit 241 may simulate the first movement trajectory by simulating a plurality of factors.

In this case, the 'factor' is an element that affects the result of simulating the movement of the ball on a virtual golf course, and may be composed of a factor item and a factor value corresponding to the factor item. According to one embodiment, the factor value may be composed of shot data and environment data.

The shot data may be calculated by the first trajectory processing unit 241 from sensing information, and the shot data may include a ball speed, a direction angle, an angle of departure, a backspin, a sidespin, a carry, a driving distance, and/or the like.

The first trajectory processing unit 241 may calculate the first movement trajectory by simulating shot data. The first movement trajectory may be calculated by simulating shot data together with environment data in a virtual golf course. In this case, the 'environment data' is an element that affects the result of simulating the movement of a golf ball on a virtual golf course, and refers to a factor value that cannot be calculated based on a golf shot of a user. In other words, the environment data is a factor value representing the environment of a virtual golf course where a user makes a golf shot, and may include, e.g., the topography, season, weather, temperature, humidity, wind speed, and wind direction of the virtual golf course.

Accordingly, the first trajectory processing unit 240 may simulate the environment data and the shot data upon simulating the first movement trajectory based on a golf shot of a user while visualizing and providing the environment of a golf course based on the environment data. In addition, the first trajectory processing unit 240 may visualize the simulated first movement trajectory and project the visualized simulated first movement trajectory onto the screen 40 through the image output unit 230.

In contrast, the second trajectory processing unit 242 may simulate and provide a second movement trajectory. In this case, the second movement trajectory is represented by a form in which a ball moves on the virtual golf course, by a form obtained by connecting the traces of the movement of the ball on the virtual golf course with lines, or by text, image, voice, or video indicating a driving distance value.

In connection with this, the virtual golf simulation device 200 may support various play modes to a user. For example, the second trajectory processing unit 242 may simulate the second movement trajectory only in a 'training mode' in which the user desires to increase a driving distance through training. Accordingly, when the user plays golf in a mode other than the training mode, the second trajectory processing unit 242 may not simulate the second movement trajectory.

According to an embodiment, the second trajectory processing unit 242 may simulate the second movement trajectory based on some of a plurality of factors that affect the simulation of the first movement trajectory.

In other words, the second trajectory processing unit 242 may simulate the second movement trajectory based only on the shot data selected from the shot data and the environment data. Through this, the user may check how much the environment of the golf course on which the user plays golf can affect the driving distance.

According to another embodiment, the second trajectory processing unit 242 may simulate the second movement trajectory based on some of the shot data.

For example, as for the environment data and the shot data used to simulate the first movement trajectory, the second movement trajectory may be simulated using only some of the shot data while using the environment data without change.

To this end, the second trajectory processing unit 242 may accumulate shot data based a golf shot of the user a plurality of times.

In connection with this, FIG. 3 is a table showing the shot data of one user, which shows shot data for a 'ball speed,' an 'angle of departure,' a 'backspin,' a 'sidespin,' a 'carry,' and a 'driving distance' as factor items.

The user may make four golf shots. As shown in FIG. 3, the second trajectory processing unit 242 may accumulate shot data based on four golf shots.

In addition, the second trajectory processing unit 242 may select one or more factor items based on the accumulated shot data, and may simulate the second movement trajectory based on shot data for the selected factor items.

According to an embodiment, the second trajectory processing unit 242 may select one or more factor items each having shot data with a value within a predetermined range a predetermined number of times or more from the accumulated shot data.

For example, the second trajectory processing unit 242 may select one or more factor items each having the same value a predetermined number of times or more from the accumulated shot data. Referring to FIG. 3, the second trajectory processing unit 242 may select a 'ball speed' having '62', a 'backspin' having '3,000', and a 'sidespin' having '100', which appears twice out of four times, as factor items.

As another example, the second trajectory processing unit 242 may select one or more factor items each having a value within a desirably set range a predetermined number of times or more from the accumulated shot data. Referring to FIG. 3, the second trajectory processing unit 242 may select a factor item having a value within the range of 61 to 63 three or more times. Referring to FIG. 3, the 'backspin,' which is a factor item having a value within the range of 61 to 63 four times, may be selected.

As another example, the second trajectory processing unit 242 may acquire the average value of the values of a plurality of other users for each factor item, and may select one or more factor items each having a value within a predetermined range a predetermined number of times or more based on the average value. For example, when the average value of the values of a plurality of other users for the 'sidespin' is 100 and a user has four or more values each with a difference of 1 from 100, the 'sidespin' may be selected as a factor item. Referring to FIG. 3, the second trajectory processing unit 242 may select the 'sidespin' as a factor item because all the values of the user for the 'sidespins' have a difference of 1 from 100.

According to another embodiment, the second trajectory processing unit 242 may calculate the average values of shot data for the respective factor items, and may select one or more factor items based on the average values.

For example, referring to FIG. 3, the second trajectory processing unit 242 may calculate average values 310 for the respective factor items.

In addition, the second trajectory processing unit 242 may select one or more factor items each having a value within a predetermined range based on the average values of the shot data or one or more factor items in each of which the corresponding average value of the shot data appears repeatedly.

In addition, one or more factor items selected as described above may be set as 'fixed items.' Furthermore, one or more items that are not selected as the fixed items and affect the simulation of a golf shot may be set as 'floating items.'

As shown in FIG. 3, the 'ball speed' and 'sidespin,' for which the average value 310 appears twice out of four times, may be selected as the fixed items, and the remaining items, i.e., the 'angle of departure' and the 'backspin,' may be selected as the floating items.

Furthermore, as shown in FIG. 3, the 'ball speed' and the 'sidespin' each having values within a difference range of 1 based on the average value 310 may be selected as the fixed items, and the remaining items 'angle of departure' and 'backspin' may be selected as the floating items.

The second trajectory processing unit 242 may simulate the second movement trajectory a plurality of times by setting shot data, selected as each of the fixed items as described above, as an average value, changing shot data for a factor item, selected as each of the floating items, multiple times, and then performing simulation.

In connection with this, in FIGS. 4 and 5, the maximum driving distance is calculated by setting each of the fixed items 'ball speed' and 'sidespin' of FIG. 3 to an average value and setting various values for each of the floating items 'angle of departure' and 'backspin.'

In other words, as shown in FIG. 4, the second trajectory processing unit 242 may set various values for the 'angle of departure' of the floating items and simulate a corresponding second movement trajectory. When the driving distance is calculated accordingly, the maximum driving distance 410 is calculated when the value of the 'angle of departure' is '13.' The value '13' at which the maximum driving distance can be calculated may be set as the optimal value of the 'angle of departure' item.

Furthermore, as shown in FIG. 5, the second trajectory processing unit 242 may set various values for the 'backspin' of the floating items and simulate a corresponding second movement trajectory. When the value of the 'backspin' is '3,000' accordingly, the maximum driving distance 510 is calculated, and the value '3,000' at which the maximum driving distance can be calculated may be set as the optimum value of the 'backspin' item.

The second trajectory processing unit 242 may visualize the second movement trajectory simulating the shot data of the floating and fixed items having the optimal value and display it on the screen 40 through the image output unit 230.

Figure 6:
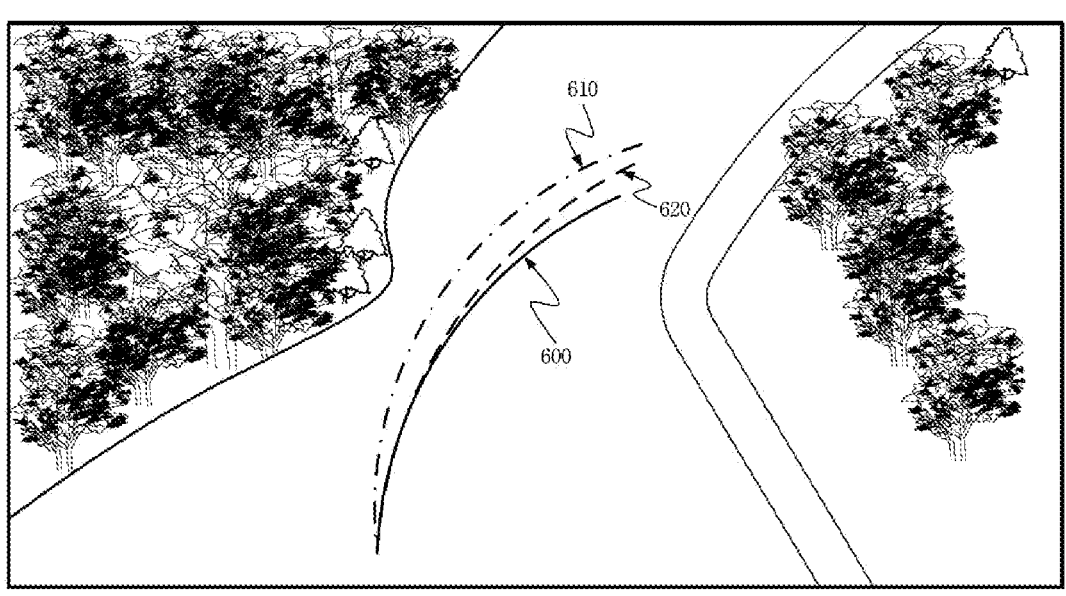
Figure 7:
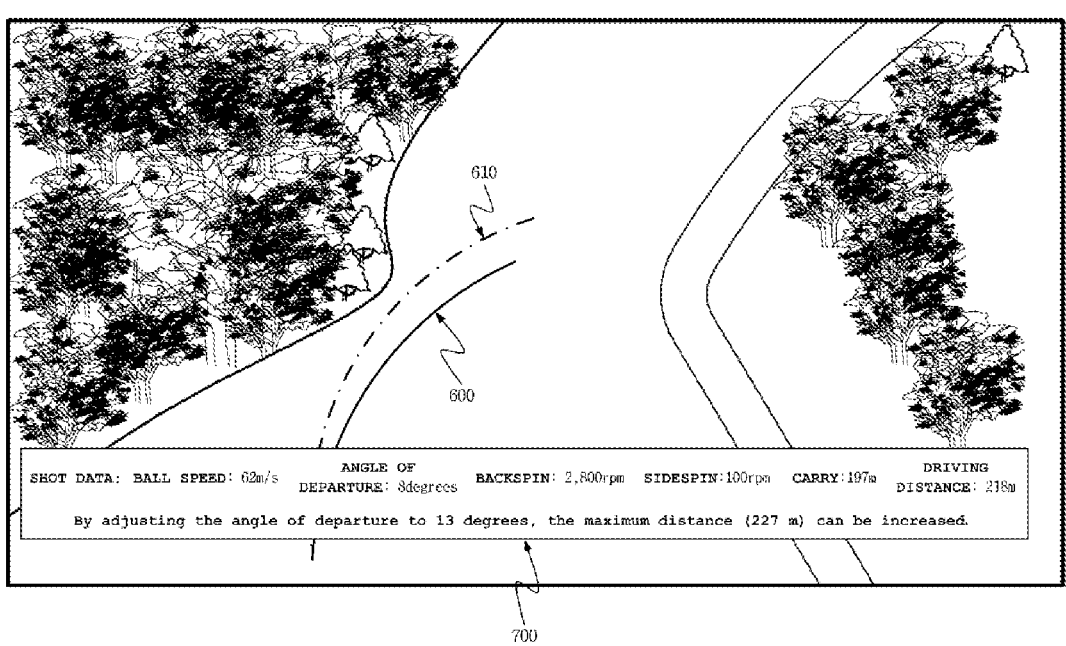

In connection with this, FIGS. 6 and 7 show views in which an image in which a second movement trajectory is simulated is displayed on a screen. As shown in FIG. 6, the second trajectory processing unit 242 visualizes second movement trajectories 610 and 620 so that the second movement trajectories 610 and 620 can be displayed together with a first movement trajectory 600 calculated by the first trajectory processing unit 241.

In other words, the second trajectory processing unit 242 may allow the second movement trajectory 610, obtained by setting the 'angle of departure' to 13 degrees and then performing simulation and visualization in FIG. 4, to be displayed on the screen 30. Furthermore, the second trajectory processing unit 242 may allow the second movement trajectory 620, obtained by setting the "backspin" to an optimum value of 3,000 rpm and then performing simulation and visualization in FIG. 5, to be displayed on the screen 30.

In this case, although the second trajectory processing unit 242 may visualize and provide the second movement trajectories 610 and 620 so that they can be displayed together with the first movement trajectory 600 as shown in FIG. 6, the present invention is not necessarily limited thereto. Alternatively, the second trajectory processing unit 242 may visualize and provide the second movement trajectories 610 and 620 so that they can be displayed after the first movement trajectory 600 has been displayed.

In addition, the second trajectory processing unit 242 may calculate one or more second movement trajectories, may select one of the second movement trajectories that enables the maximum driving distance, and may visualize and provide the selected second movement trajectory. As shown in FIG. 6, when a plurality of second movement trajectories are simulated, multiple second movement trajectories selected from among the plurality of second movement trajectories may be visualized and provided.

Furthermore, the second trajectory processing unit 242 may simulate and provide feedback information as well. By providing 'feedback information,' including the optimal value determined in the process of simulating the second movement trajectory, to a user, the user may be notified of a part that needs to be improved. Such feedback information may be implemented as at least one of text, image, voice, and video and then provided to a user.

In connection with this, as shown in FIG. 7, the second trajectory processing unit 242 may generate feedback information 700 and provide it to a user.

The feedback information includes the factor item of the shot data for the optimal value capable of improving the maximum driving distance and also includes information about the value, so that a user's own shot data and optimal value can be compared and analyzed.

Accordingly, a user who has checked the screen shown in FIG. 7 determines that his or her angle of departure is 8 degrees and the maximum driving distance can be increased by practicing increasing the angle of departure to 13 degrees, and may practice increasing the angle of departure.

Figure 8:
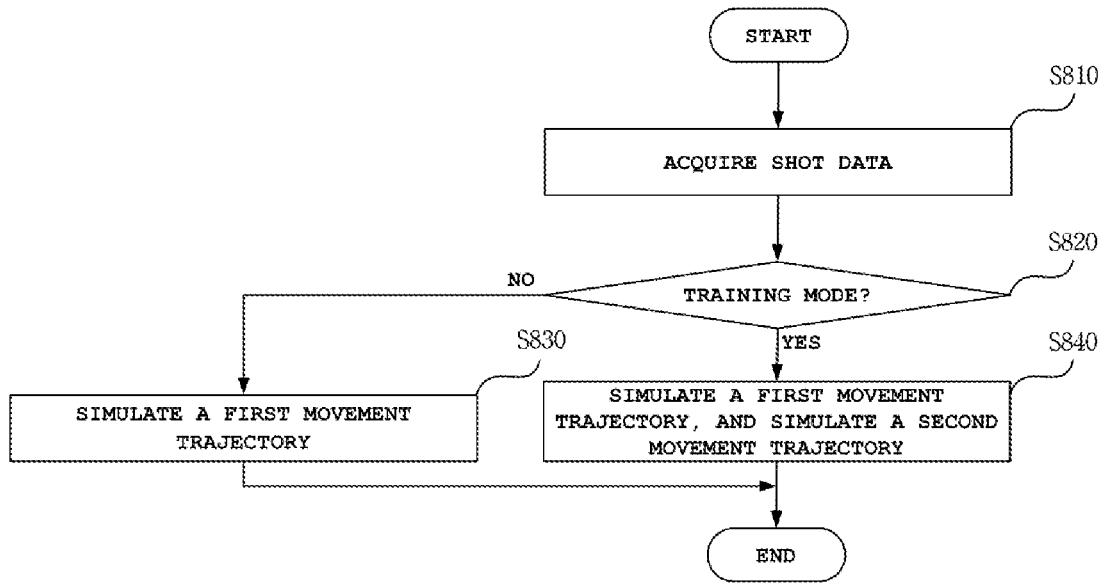
FIGS. 8 and 9 are flowcharts illustrating a virtual golf simulation method according to an embodiment disclosed herein.
Figure 9:
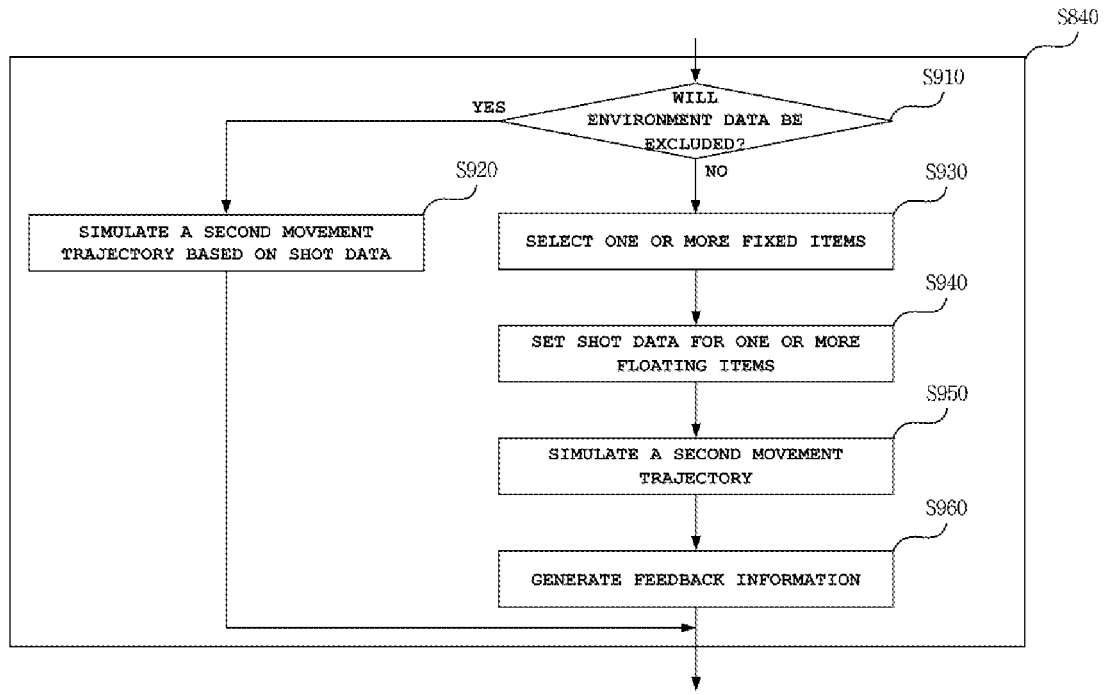

Meanwhile, FIGS. 8 and 9 are flowcharts illustrating a virtual golf simulation method according to an embodiment. The virtual golf simulation method according to the embodiment shown in FIGS. 8 and 9 includes steps that are processed in a time-series manner by the virtual golf simulation device 200 shown in FIGS. 1 to 7. Accordingly, the descriptions that are omitted below but have been given above in conjunction with the virtual golf simulation device 200 may also be applied to the virtual golf simulation method according to the embodiment shown in FIGS. 8 and 9.

As shown in FIG. 8, the virtual golf simulation device 200 may acquire shot data in step S810.

If it is determined that a current mode is not a training mode in step S820, the virtual golf simulation device 200 may simulate and provide a first movement trajectory in step S830.

In contrast, if it is determined that a current mode is a training mode in step S820, the virtual golf simulation device 200 may simulate and provide a first movement trajectory and also simulate and provide a second movement trajectory in step S840.

The virtual golf simulation device 200 may simulate the second movement trajectory based on some of shot data for the simulation of the first movement trajectory, and may simulate a second movement trajectory for calculating the maximum driving distance as the second movement trajectory.

In this case, the virtual golf simulation device 200 may acquire and accumulate shot data multiple times.

For example, the virtual golf simulation device 200 may acquire and accumulate shot data regardless of the mode, or may request a user to make a golf shot multiple times in a training mode and accumulate the shot data acquired accordingly.

Meanwhile, referring to FIG. 9, the virtual golf simulation device 200 may simulate the second movement trajectory based on some of a plurality of factors for the simulation of the first movement trajectory.

In other words, if it is determined that environment data will be excluded from the plurality of factors for the calculation of the first movement trajectory in step S910, the virtual golf simulation device 200 may simulate the second movement trajectory simulating shot data exclusive of the environment data and provide the result of the simulation to the user in step S920. Through this, the user may check how much an environment factor affects his or her shot.

In contrast, the virtual golf simulation device 200 may simulate the second movement trajectory based on some of the shot data while including the environment data of the plurality of factors for the simulation of the first movement trajectory.

To this end, the virtual golf simulation device 200 may select some of the factor items for the simulation of the first movement trajectory, and may set the shot data of the user for the selected factor items as fixed items.

In other words, the virtual golf simulation device 200 may select one or more fixed items from among factor items related to the shot data in step S930.

For example, the virtual golf simulation device 200 may select, as the fixed items, one or more factor items each having the same value a predetermined number of times or more from shot data based on golf shots of the user accumulated a plurality of times.

Alternatively, for example, the virtual golf simulation device 200 may select, as the fixed items, one or more factor items each having a value within a predetermined range a predetermined number of times or more from shot data based on golf shots of the user accumulated a plurality of times.

Alternatively, for example, the virtual golf simulation device 200 may calculate the average values of shot data based on golf shots of the user accumulated a plurality of times, and may select one or more factor items selected based on the average values as the fixed items. For example, one or more factor items for shot data each having a value within a predetermined difference range based on a corresponding average value may be selected as the fixed items.

The virtual golf simulation device 200 may set the shot data of the user for the fixed items selected as described above. For example, the virtual golf simulation device 200 may set, e.g., the average value of the shot data of the user for each of the corresponding items. Furthermore, the virtual golf simulation device 200 may simulate the second movement trajectory in step S950 by setting a desirable value for each of the floating items or setting a value within a predetermined range based on the average value of the shot data of the user for each of the floating items in step S940.

In addition, the virtual golf simulation device 200 may provide the second movement trajectory according to the result of the simulation, and may also generate and provide feedback information in step S960.

In connection with this, although the virtual golf simulation device 200 has been described via the embodiment in which the second movement trajectory related to the maximum driving distance is processed in the foregoing description, the virtual golf simulation device 200 may operate even in an embodiment in which a second movement trajectory related to an element capable of improving a user's golfing ability, other than the maximum driving distance, is processed. For example, the virtual golf simulation device 200 may also operate even in an embodiment in which one or more fixed items are selected to reduce the number of putts and then a second movement trajectory for enabling the optimal number of putts is simulated and provided.

It may be difficult for a user to improve his or her ball speed through physical training due to inherent physical limitations and/or the like. According to the virtual golf simulation method according to the embodiment described herein, a user is allowed to perform efficient training by proposing a floating value that can be improved by the user and how to improve the corresponding value.

The virtual golf simulation method described above may also be implemented in the form of a computer-readable medium that stores instructions and data that can be executed by a computer. In this case, the instructions and the data may be stored in the form of program code, and may generate a predetermined program module and perform a predetermined operation when executed by a processor. Furthermore, the computer-readable medium may be any type of available medium that can be accessed by a computer, and may include volatile, non-volatile, separable and non-separable media. Furthermore, the computer-readable medium may be a computer storage medium. The computer storage medium may include all volatile, non-volatile, separable and non-separable media that store information, such as computer-readable instructions, a data structure, a program module, or other data, and that are implemented using any method or technology. For example, the computer storage medium may be a magnetic storage medium such as an HDD, an SSD, or the like, an optical storage medium such as a CD, a DVD, a Blu-ray disk or the like, or memory included in a server that can be accessed over a network.

The virtual golf simulation method described above may be implemented as a computer program (or a computer program product) including computer-executable instructions. The computer program includes programmable machine instructions that are processed by a processor, and may be implemented as a high-level programming language, an object-oriented programming language, an assembly language, a machine language, or the like. Furthermore, the computer program may be stored in a tangible computer-readable storage medium (for example, memory, a hard disk, a magnetic/optical medium, a solid-state drive (SSD), or the like).

The virtual golf simulation method described above may be implemented in such a manner that the above-described computer program is executed by a computing device. The computing device may include at least some of a processor, memory, a storage device, a high-speed interface connected to memory and a high-speed expansion port, and a low-speed interface connected to a low-speed bus and a storage device. These individual components are connected using various buses, and may be mounted on a common motherboard or using another appropriate method.

In this case, the processor may process instructions within a computing device. An example of the instructions is instructions which are stored in memory or a storage device in order to display graphic information for providing a Graphic User Interface (GUI) onto an external input/output device, such as a display connected to a high-speed interface. As another embodiment, a plurality of processors and/or a plurality of buses may be appropriately used along with a plurality of pieces of memory. Furthermore, the processor may be implemented as a chipset composed of chips including a plurality of independent analog and/or digital processors.

Furthermore, the memory stores information within the computing device. As an example, the memory may include a volatile memory unit or a set of the volatile memory units. As another example, the memory may include a non-volatile memory unit or a set of the non-volatile memory units. Furthermore, the memory may be another type of computer-readable medium, such as a magnetic or optical disk.

In addition, the storage device may provide a large storage space to the computing device. The storage device may be a computer-readable medium, or may be a configuration including such a computer-readable medium. For example, the storage device may also include devices within a storage area network (SAN) or other elements, and may be a floppy disk device, a hard disk device, an optical disk device, a tape device, flash memory, or a similar semiconductor memory device or array.

The term 'unit' used in the above-described embodiments means software or a hardware component such as a field-programmable gate array (FPGA) or application-specific integrated circuit (ASIC), and a 'unit' performs a specific role. However, a 'unit' is not limited to software or hardware. A 'unit' may be configured to be present in an addressable storage medium, and also may be configured to run one or more processors. Accordingly, as an example, a 'unit' includes components, such as software components, object-oriented software components, class components and task components, processes, functions, attributes, procedures, subroutines, segments in program code, drivers, firmware, microcode, circuits, data, a database, data structures, tables, arrays, and variables.

Each of the functions provided in components and 'unit(s)' may be coupled to a smaller number of components and 'unit(s)' or divided into a larger number of components and 'unit(s).'

In addition, components and 'unit(s)' may be implemented to run one or more CPUs in a device or secure multimedia card. The above-described embodiments are intended for illustrative purposes. It will be understood that those having ordinary knowledge in the art to which the present invention pertains can easily make modifications and variations without changing the technical spirit and essential features of the present invention. Therefore, the above-described embodiments are illustrative and are not limitative in all aspects. For example, each component described as being in a single form may be practiced in a distributed form. In the same manner, components described as being in a distributed form may be practiced in an integrated form.

The scope of protection pursued via the present specification should be defined by the attached claims, rather than the detailed description. All modifications and variations which can be derived from the meanings, scopes and equivalents of the claims should be construed as falling within the scope of the present invention.

The invention claimed is:

1. A virtual golf simulation device for simulating movement of a ball on a virtual golf course, the virtual golf simulation device comprising:
   a first trajectory processing unit configured to simulate a first movement trajectory of a ball on a virtual golf course based on shot data, which is calculated from sensing information received from a sensing device, from a golf shot of a user;
   a second trajectory processing unit configured to simulate a second movement trajectory based on some of a plurality of shot data for the simulation of the first movement trajectory, from a plurality of golf shots of the user; and
   an image output unit configured to provide a visualized simulation image to an image output device so that the first movement trajectory and the second movement trajectory are displayed together, wherein a plurality of factors affect a result of simulating movement of the ball on the virtual golf course, each factor comprising a factor item and a factor value corresponding to the factor item, and the factor value comprises shot data, and wherein the second trajectory processing unit is further configured to:

accumulate shot data from the plurality of golf shots of the user, identify one or more factor items each having a factor value within a predetermined range for a predetermined number of golf shots or more from the accumulated shot data, set the identified factor items as fixed items, set remaining factor items other than the fixed items as floating items, and simulate the second movement trajectory by changing shot data corresponding to the floating items.

2. The virtual golf simulation device of claim 1, wherein the second trajectory processing unit is further configured to:

calculate average values of the accumulated shot data for the respective factor items, and set one or more identified factor items as the fixed items based on the average values.

3. The virtual golf simulation device of claim 1, wherein the second trajectory processing unit is further configured to:

simulate a second movement trajectory for calculating a maximum driving distance as the second movement trajectory.

4. The virtual golf simulation device of claim 1, wherein the second trajectory processing unit is further configured to generate feedback information based on the second movement trajectory.

5. A virtual golf simulation method by which a virtual golf simulation device simulates movement of a ball on a virtual golf course, the virtual golf simulation method comprising:

acquiring, by a processor of the virtual golf simulation device, shot data, which is calculated from sensing information received from a sensing device, from a golf shot of a user;

simulating, by the processor, a first movement trajectory of a ball on a virtual golf course based on the shot data, and also simulating a second movement trajectory based on some of a plurality of shot data for the simulation of the first movement trajectory, from a plurality of golf shots of the user; and providing, by the processor, a visualized simulation image to an image output device so that the first movement trajectory and the second movement trajectory are displayed together, wherein a plurality of factors affect a result of simulating movement of the ball on the virtual golf course, each factor comprising a factor item and a factor value corresponding to the factor item, and the factor value comprises shot data, and wherein simulating the second movement trajectory comprises:

accumulating shot data from the plurality of golf shots of the user, identifying one or more factor items each having a factor value within a predetermined range for a predetermined number of golf shots or more from the accumulated shot data, setting the identified factor items as fixed items, setting remaining factor items other than the fixed items as floating items, and simulating the second movement trajectory by changing shot data corresponding to the floating items.

6. The virtual golf simulation method of claim 5, wherein simulating the second movement trajectory comprises:

calculating average values of the accumulated shot data for the respective factor items; and setting one or more identified factor items as the fixed items based on the average values.

7. The virtual golf simulation method of claim 5, wherein simulating the second movement trajectory further comprises:

simulating a second movement trajectory for calculating a maximum driving distance as the second movement trajectory.

8. The virtual golf simulation method of claim 5, wherein simulating the second movement trajectory further comprises generating feedback information based on the second movement trajectory.

* * * * *